United States Patent
Kim et al.

(10) Patent No.: US 10,149,232 B2
(45) Date of Patent: Dec. 4, 2018

(54) METHOD FOR PARTICIPATING IN NAN CLUSTER IN WIRELESS COMMUNICATION SYSTEM AND DEVICE THEREFOR

(71) Applicant: LG ELECTRONICS INC., Seoul (KR)

(72) Inventors: Dongcheol Kim, Seoul (KR); Byungjoo Lee, Seoul (KR); Giwon Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 121 days.

(21) Appl. No.: 15/111,029

(22) PCT Filed: Feb. 24, 2015

(86) PCT No.: PCT/KR2015/001740
§ 371 (c)(1),
(2) Date: Jul. 12, 2016

(87) PCT Pub. No.: WO2015/126220
PCT Pub. Date: Aug. 27, 2015

(65) Prior Publication Data
US 2016/0345242 A1    Nov. 24, 2016

Related U.S. Application Data

(60) Provisional application No. 61/943,503, filed on Feb. 24, 2014.

(51) Int. Cl.
*H04W 48/10* (2009.01)
*H04W 48/16* (2009.01)
*H04W 84/20* (2009.01)

(52) U.S. Cl.
CPC .......... *H04W 48/10* (2013.01); *H04W 48/16* (2013.01); *H04W 84/20* (2013.01)

(58) Field of Classification Search
CPC ..... H04W 84/12; H04W 48/10; H04W 8/005; H04W 56/0015; H04W 84/20; H04W 84/18; H04W 48/16; H04W 4/08; H04W 52/0229; H04W 56/001; H04W 4/008; H04W 52/02; H04L 45/20; H04L 41/0668; H04L 45/70
USPC .............................. 455/434, 418, 422.1, 428
See application file for complete search history.

(56) References Cited

U.S. PATENT DOCUMENTS

| | | | |
|---|---|---|---|
| 8,411,684 B1* | 4/2013 | Das | H04L 45/20 370/238 |
| 2006/0159024 A1 | 7/2006 | Hester | |
| 2008/0205360 A1 | 8/2008 | Ren et al. | |
| 2010/0090823 A1 | 4/2010 | Park et al. | |
| 2010/0272082 A1 | 10/2010 | Niranjan et al. | |
| 2011/0064072 A1 | 3/2011 | Wang et al. | |
| 2014/0153444 A1* | 6/2014 | Zhou | H04W 40/12 370/256 |

(Continued)

FOREIGN PATENT DOCUMENTS

KR  10-2010-0040214 A    4/2010

*Primary Examiner* — Fred Casca
(74) *Attorney, Agent, or Firm* — Birch, Stewart, Kolasch & Birch, LLP (57) ABSTRACT

A method for joining one of a plurality of NAN clusters by a NAN terminal when the NAN terminal discovers the plurality of the NAN clusters and a NAN terminal therefor are provided.

10 Claims, 7 Drawing Sheets

(56) References Cited

U.S. PATENT DOCUMENTS

| | | | |
|---|---|---|---|
| 2015/0036540 A1* | 2/2015 | Kasslin | H04W 48/18 370/254 |
| 2015/0200811 A1* | 7/2015 | Kasslin | H04L 41/12 370/254 |

* cited by examiner

METHOD FOR PARTICIPATING IN NAN CLUSTER IN WIRELESS COMMUNICATION SYSTEM AND DEVICE THEREFOR

CROSS REFERENCE TO RELATED APPLICATIONS

This application is the National Phase of PCT/KR2015/001740 filed on Feb. 24, 2015, which claims priority under 35 U.S.C. § 119(e) to U.S. Provisional Application No. 61/943,503 filed on Feb. 24, 2014, all of which are hereby expressly incorporated by reference into the present application.

TECHNICAL FIELD

The present invention relates to a wireless communication system, and more particularly, to a method for participating in a NAN cluster and device therefor.

BACKGROUND ART

Recently, various wireless communication technologies have been developed with the advancement of information communication technology. Among the wireless communication technologies, a wireless local area network (WLAN) is the technology capable of accessing the Internet by wireless in a home, a company or a specific service provided area through portable terminal such as a personal digital assistant (PDA), a laptop computer, a portable multimedia player (PMP), etc. based on a radio frequency technology.

DISCLOSURE OF THE INVENTION

Technical Task

One technical task of the present invention is to provide a method for a NAN (neighbor awareness networking) terminal to join any one of a plurality of NAN clusters when the NAN terminal discovers the plurality of the NAN clusters.

Another technical task of the present invention is to provide a method for all terminals in a NAN cluster to use a common threshold.

Technical tasks obtainable from the present invention are non-limited by the above-mentioned technical task. And, other unmentioned technical tasks can be clearly understood from the following description by those having ordinary skill in the technical field to which the present invention pertains.

Technical Solutions

In a first technical aspect of the present invention, provided herein is a method of joining a NAN (neighbor awareness networking) cluster by a NAN terminal in a wireless communication system, including: discovering the NAN cluster; and if a plurality of NAN clusters are discovered, receiving a NAN beacon frame from any one of the plurality of the NAN clusters. In this case, if a hop count to an anchor master indicated by the received NAN beacon frame is greater than a threshold, the NAN terminal may receive the NAN beacon frame from the other one of the plurality of the NAN clusters.

In a second technical aspect of the present invention, provided herein is a NAN (neighbor awareness networking) terminal apparatus for joining a NAN cluster in a wireless communication system, including: a transceiving module; and a processor. The processor may be configured to control the transceiving module to discover the NAN cluster and, if a plurality of NAN clusters are discovered, control the transceiving module to receive a NAN beacon frame from any one of the plurality of the NAN clusters. In this case, if a hop count to an anchor master indicated by the received NAN beacon frame is greater than a threshold, the processor may be configured to control the transceiving module to receive the NAN beacon frame from the other one of the plurality of the NAN clusters.

At least one of the following items may be applied to the first and second technical aspects of the present invention.

Preferably, the NAN terminal may receive the NAN beacon frame in order of cluster grade of the plurality of the NAN clusters.

Preferably, the cluster grade may be calculated according to a formula of: $2^{64}*A1+A2$ where A1 represents Master Preference of the anchor master and A2 represents a TSF value of each NAN cluster.

Preferably, the NAN terminal may receive the NAN beacon frame from only a NAN cluster providing a service preferred by the NAN terminal among the plurality of the NAN clusters.

Preferably, a step of discovering the NAN cluster may include transmitting a probe request frame and receiving a probe response frame in response to the probe request frame. In this case, the NAN terminal may receive the NAN beacon frame by waking up in a discovery window calculated based on a time offset field value contained in the probe response frame.

Preferably, a step of discovering the NAN cluster may include receiving a NAN discovery beacon frame. In this case, the NAN terminal may receive the NAN beacon frame by waking up in a discovery window calculated based on a time offset field value contained in the NAN discovery beacon frame.

Preferably, the NAN terminal may receive the NAN beacon frame in order of discovering the plurality of the NAN clusters.

Preferably, if the hop count to the anchor master in each of the plurality of the NAN clusters is greater than the threshold, the NAN terminal may create a new NAN cluster.

Preferably, the NAN beacon frame may include a threshold field and the NAN terminal may update the threshold to a value indicated by the threshold field.

In this case, only if the hop count to the anchor master contained in the NAN beacon frame is less than the threshold, the NAN terminal may update the threshold to a value indicated by a hop count threshold filed.

Advantageous Effects

According to the present invention, there is provided a method for a NAN (neighbor awareness networking) terminal to join any one of a plurality of the NAN terminal when the NAN terminal discovers the plurality of the NAN terminals.

In addition, the present invention is advantageous in that all terminals in a NAN cluster can use a common threshold.

Effects obtainable from the present invention are non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

FIG. 8 is a diagram illustrating a discovery window and the like.

BEST MODE FOR INVENTION

Reference will now be made in detail to the preferred embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention. The following detailed description includes specific details in order to provide the full understanding of the present invention. However, it will be apparent to those skilled in the art that the present invention may be implemented without such specific details.

The following embodiments can be achieved by combinations of structural elements and features of the present invention in prescribed forms. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment.

Specific terminologies in the following description are provided to help the understanding of the present invention. And, these specific terminologies may be changed to other formats within the technical scope or spirit of the present invention.

Occasionally, to avoid obscuring the concept of the present invention, structures and/or devices known to the public may be skipped or represented as block diagrams centering on the core functions of the structures and/or devices. In addition, the same reference numbers will be used throughout the drawings to refer to the same or like parts in this specification.

The embodiments of the present invention can be supported by the disclosed standard documents disclosed for at least one of wireless access systems including IEEE 802 system, 3GPP system, 3GPP LTE system, LTE-A (LTE-Advanced) system and 3GPP2 system. In particular, the steps or parts, which are not explained to clearly reveal the technical idea of the present invention, in the embodiments of the present invention may be supported by the above documents. Moreover, all terminologies disclosed in this document can be supported by the above standard documents.

The following embodiments of the present invention can be applied to a variety of wireless access technologies, for example, CDMA (code division multiple access), FDMA (frequency division multiple access), TDMA (time division multiple access), OFDMA (orthogonal frequency division multiple access), SC-FDMA (single carrier frequency division multiple access) and the like. CDMA can be implemented with such a radio technology as UTRA (universal terrestrial radio access), CDMA 2000 and the like. TDMA can be implemented with such a radio technology as GSM/GPRS/EDGE (Global System for Mobile communications)/General Packet Radio Service/Enhanced Data Rates for GSM Evolution). OFDMA can be implemented with such a radio technology as IEEE 802.11 (Wi-Fi), IEEE 802.16 (WiMAX), IEEE 802.20, E-UTRA (Evolved UTRA), etc. For clarity, the following description focuses on IEEE 802.11 systems. However, technical features of the present invention are not limited thereto.

Structure of WLAN System

Figure 1:
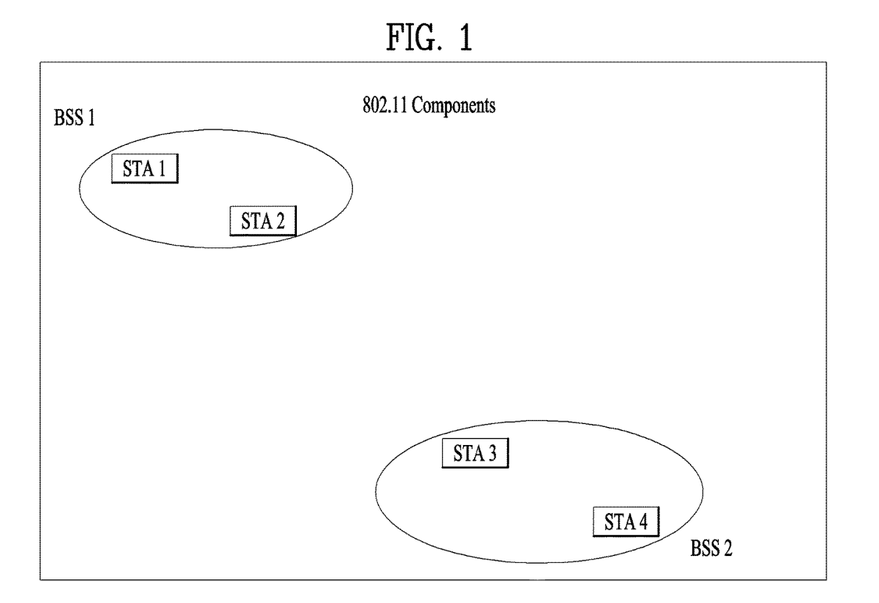
FIG. 1 is a diagram illustrating an exemplary structure of IEEE 802.11 system.

FIG. 1 is a diagram illustrating an exemplary structure of IEEE 802.11 system to which the present invention is applicable.

IEEE 802.11 structure may include a plurality of components and WLAN supportive of transparent STA mobility for an upper layer can be provided by interactions between the components. A basic service set (BSS) may correspond to a basic component block in IEEE 802.11 WLAN. FIG. 1 shows one example that two basic service sets BSS 1 and BSS 2 exist and that 2 STAs are included as members of each BSS. In particular, STA 1 and STA 2 are included in the BSS 1 and STA 3 and STA 4 are included in the BSS 2. In FIG. 1, an oval indicating the BSS can be understood as indicating a coverage area in which the STAs included in the corresponding BSS maintain communication. This area may be called a basic service area (BSA). Once the STA moves out of the BSA, it is unable to directly communicate with other STAs within the corresponding BSA.

A most basic type of BSS in IEEE 802.11 WLAN is an independent BSS (IBSS). For instance, IBSS can have a minimum configuration including 2 STAs only. Moreover, the BSS (e.g., BSS 1 or BSS 2) shown in FIG. 1, which has the simplest configuration and in which other components are omitted, may correspond to a representative example of the IBSS. Such a configuration is possible if STAs can directly communicate with each other. Moreover, the above-mentioned WLAN is not configured according to a devised plan but can be configured under the necessity of WLAN. And, this may be called an ad-hoc network.

If an STA is turned on/off or enters/escapes from a BSS area, membership of the STA in a BSS can be dynamically changed. In order to obtain the membership of the BSS, the STA can join the BSS using a synchronization procedure. In order to access all services of the BSS based structure, the STA should be associated with the BSS. This association may be dynamically configured or may include a use of a DSS (distribution system service).

Additionally, FIG. 1 shows components such as a DS (distribution system), a DSM (distribution system medium), an AP (access point) and the like.

In WLAN, a direct station-to-station distance can be restricted by PHY capability. In some cases, the restriction of the distance may be sufficient enough. However, in some cases, communication between stations located far away from each other may be necessary. In order to support extended coverage, the DS (distribution system) may be configured.

The DS means a structure in which BSSs are interconnected with each other. Specifically, the BSS may exist as an extended type of component of a network consisting of a plurality of BSSs instead of an independently existing entity as shown in FIG. 1.

The DS corresponds to a logical concept and can be specified by a characteristic of the DSM. Regarding this, IEEE 802.11 standard logically distinguishes a wireless medium (WM) from the DSM. Each of the logical media is used for a different purpose and is used as a different component. According to the definition of the IEEE 802.11 standard, the media are not limited to be identical to each other or to be different from each other. Since a plurality of the media are logically different from each other, flexibility of IEEE 802.11 WLAN structure (a DS structure or a different network structure) can be explained. In particular, the IEEE 802.11 WLAN structure can be implemented in various ways and the WLAN structure can be independently specified by a physical characteristic of each implementation case.

The DS can support a mobile device in a manner of providing seamless integration of a plurality of BSSs and logical services necessary for handling an address to a destination.

The AP enables associated STAs to access the DS through the WM and corresponds to an entity having STA functionality. Data can be transferred between the BSS and the DS through the AP. For instance, as shown in FIG. 1, while each of the STA 2 and STA 3 have STA functionality, the STA 2 and STA 3 provide functions of enabling associated STAs (STA 1 and STA 4) to access the DS. And, since all APs basically correspond to an STA, all APs correspond to an addressable entity. An address used by the AP for communication in the WM should not be identical to an address used by the AP for communication in the DSM.

Data transmitted from one of STAs associated with an AP to an STA address of the AP is always received in an uncontrolled port and the data can be processed by an IEEE 802.1X port access entity. Moreover, if a controlled port is authenticated, transmission data (or frame) can be delivered to a DS.

Layer Structure

Operations of the STA which operates in a wireless LAN system can be explained in terms of the layer structure. In terms of a device configuration, the layer structure can be implemented by a processor. The STA may have a structure of a plurality of layers. For example, a main layer structure handled in the 802.11 standard document includes a MAC sublayer and a physical (PHY) layer on a data link layer (DLL). The PHY layer may include a physical layer convergence procedure (PLCP) entity, a physical medium dependent (PMD) entity, etc. The MAC sublayer and the PHY layer conceptually include management entities called MAC sublayer management entity (MLME) and physical layer management entity (PLME), respectively. These entities provide a layer management service interface for performing a layer management function.

A station management entity (SME) is present within each STA in order to provide an accurate MAC operation. The SME is a layer-independent entity that may be considered as existing in a separate management plane or as being off to the side. Detailed functions of the SME are not specified in this document but it may be generally considered as being responsible for functions of gathering layer-dependent status from the various layer management entities (LMEs), setting values of layer-specific parameters similar to each other. The SME may perform such functions on behalf of general system management entities and may implement a standard management protocol.

The aforementioned entities interact with each other in various ways. For example, the entities may interact with each other by exchanging GET/SET primitives. The primitive means a set of elements or parameters related to a specific purpose. XX-GET.request primitive is used for requesting a value of a given MIB attribute (management information based attribute). XX-GET.confirm primitive is used for returning an appropriate MIB attribute value if a status is 'success', otherwise it is used for returning an error indication in a status field. XX-SET.request primitive is used to request that an indicated MIB attribute be set to a given value. If this MIB attribute implies a specific action, this requests that the action be performed. And, XX-SET.confirm primitive is used such that, if the status is 'success', this confirms that the indicated MIB attribute has been set to the requested value, otherwise it is used to return an error condition in the status field. If this MIB attribute implies a specific action, this confirms that the action has been performed.

Moreover, the MLME and the SME may exchange various MLME_GET/SET primitives through an MLME SAP (service access point). Furthermore, various PLME_GET/SET primitives may be exchanged between the PLME and the SME through PLME_SAP and may be exchanged between the MLME and the PLME through an MLME-PLME_SAP.

NAN (Neighbor Awareness Network) Topology

Figure 2:
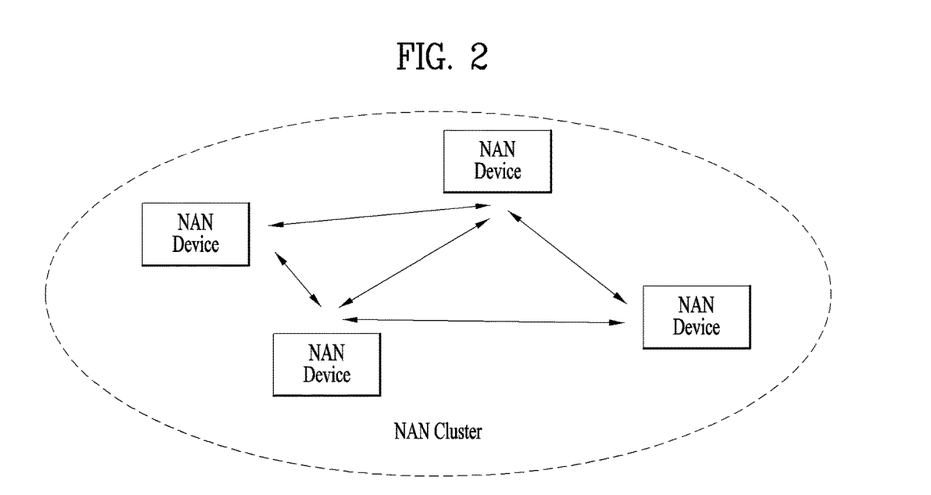
FIGS. 2 and 3 are diagrams illustrating examples of a NAN cluster.
Figure 3:
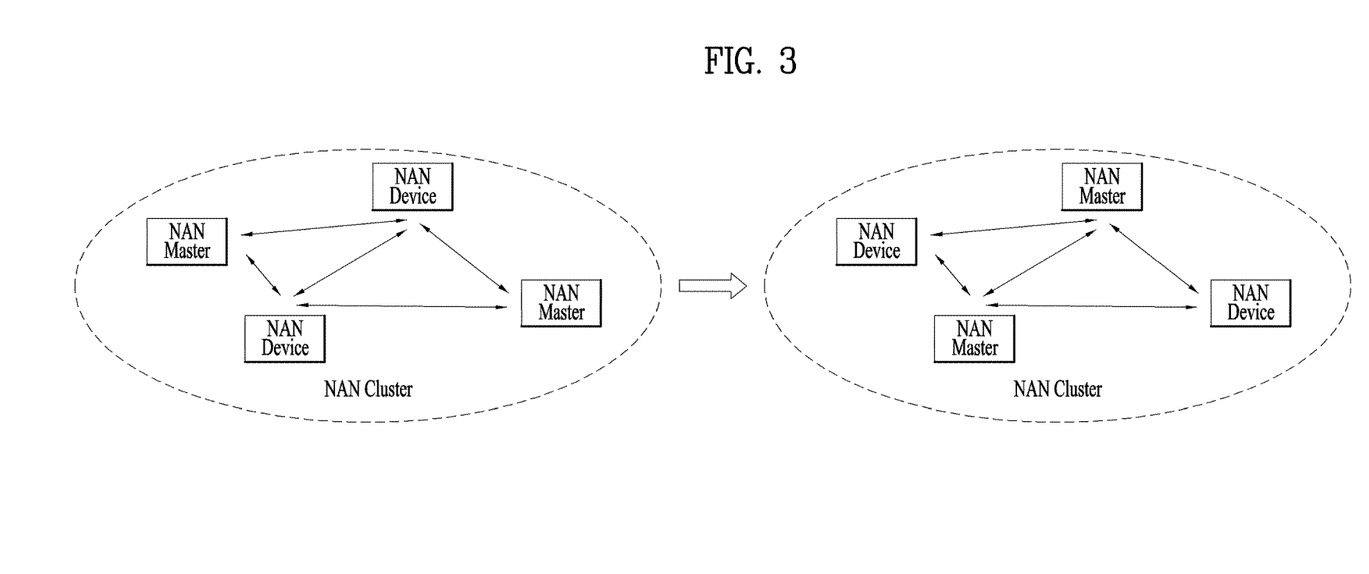

A NAN network can be constructed with NAN devices (terminals) that use a set of identical NAN parameters (e.g., a time interval between consecutive discovery windows, an interval of a discovery window, a beacon interval, a NAN channel, etc.). A NAN cluster can be formed by NAN terminals and the NAN cluster means a set of NAN terminals that are synchronized on the same discovery window schedule. And, a set of the same NAN parameters is used in the NAN cluster. FIG. 2 illustrates an example of the NAN cluster. A NAN terminal included in the NAN cluster may directly transmit a multicast/unicast service discovery frame to a different NAN terminal within a range of the discovery window. As shown in FIG. 3, at least one NAN master may exist in a NAN cluster and the NAN master may be changed. Moreover, the NAN master may transmit all of a synchronization beacon frame, discovery beacon frame and service discovery frame.

NAN Device Architecture

Figure 4:
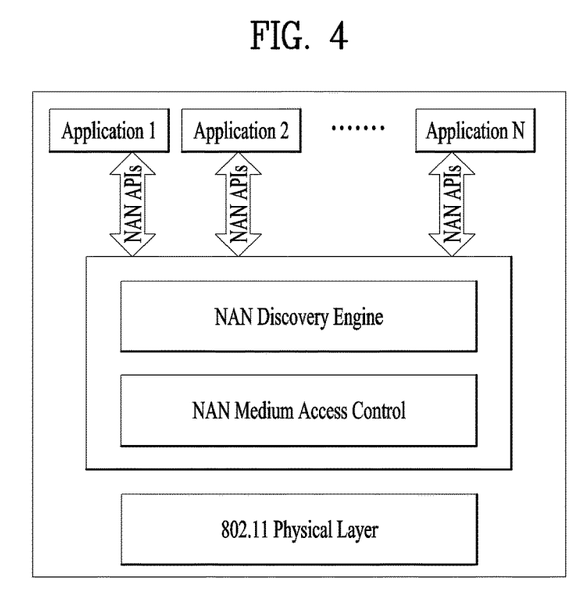
FIG. 4 illustrates an example of a structure of a NAN device (terminal).

FIG. 4 illustrates an example of a structure of a NAN device (terminal). Referring to FIG. 4, the NAN terminal is based on a physical layer in 802.11 and its main components correspond to a NAN discovery engine, a NAN MAC (medium access control), and NAN APIs connected to respective applications (e.g., Application 1, Application 2, . . . , Application N).

Figure 5:
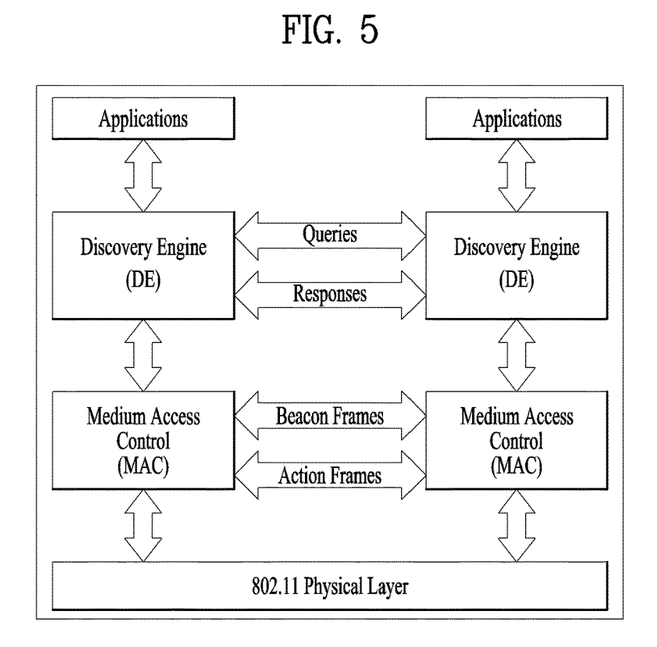
FIGS. 5 and 6 illustrate relations between NAN components.
Figure 6:
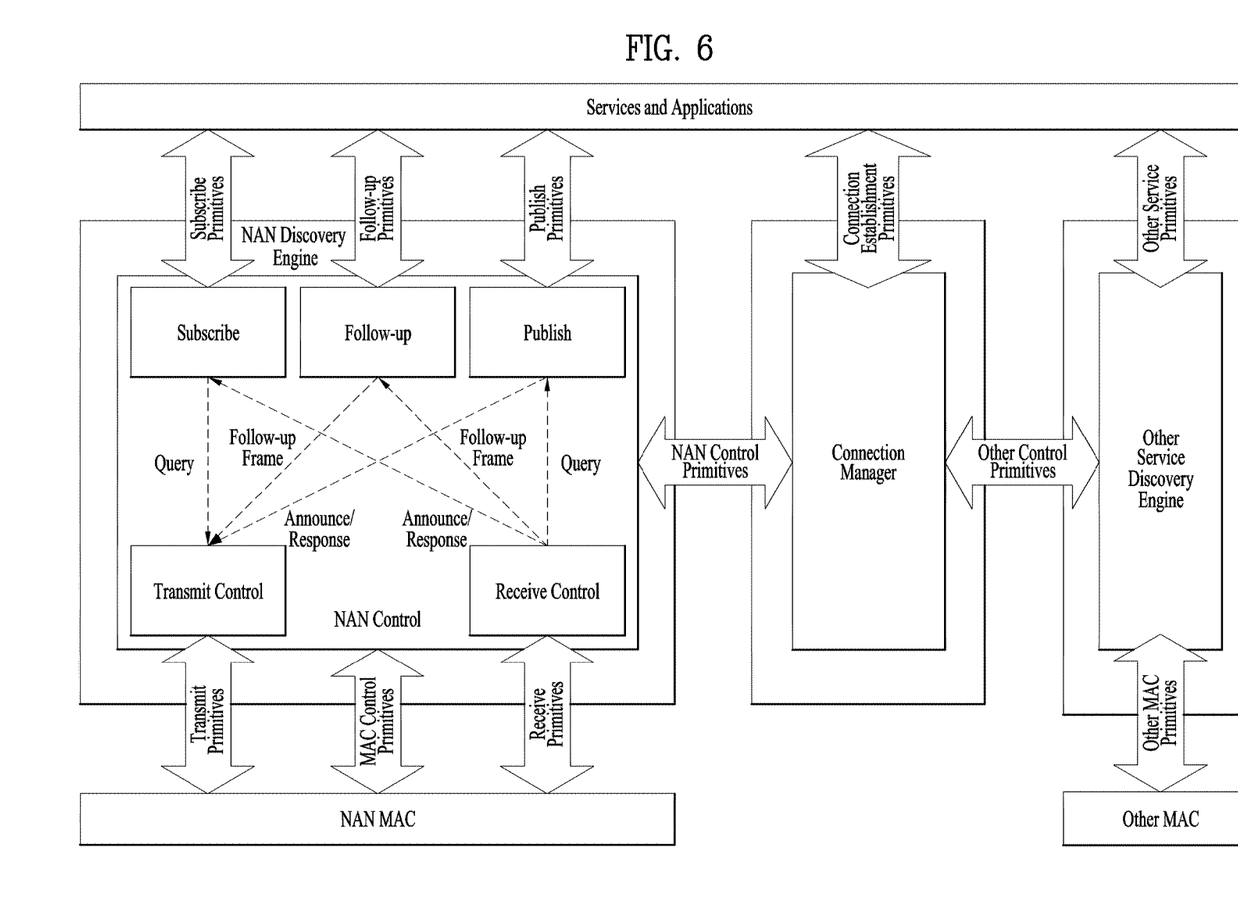

FIGS. 5 and 6 illustrate relations between NAN components. Service requests and responses are processed through the NAN discovery engine, and the NAN beacon frames and the service discovery frames are processed by the NAN MAC. Here, the NAN beacon frame may include at least one of a NAN synchronization beacon frame and a NAN discovery beacon frame. The NAN discovery engine may provide functions of subscribing, publishing, and following-up. The publish/subscribe functions are operated by services/applications through a service interface. If the publish/ subscribe commands are executed, instances for the publish/subscribe functions are generated. Each of the instances is driven independently and a plurality of instances can be driven simultaneously in accordance with the implementation. The follow-up function corresponds to means for the services/applications that transceive specific service information.

Role and State of NAN Device

Figure 7:
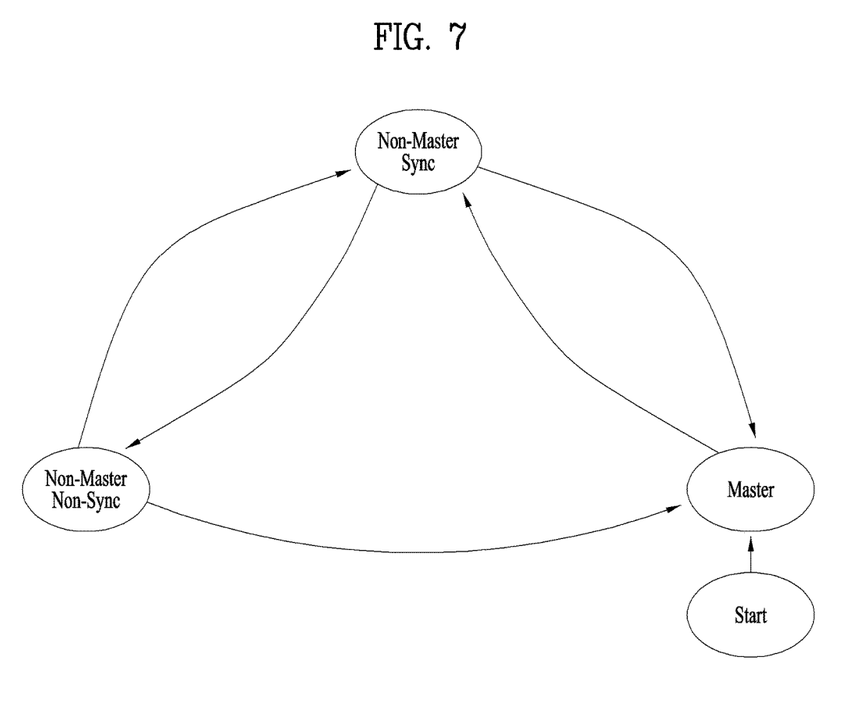
FIG. 7 is a diagram illustrating a state transition of a NAN device (terminal).

As mentioned in the foregoing description, a NAN device (terminal) can serve as a NAN master and the NAN master can be changed. In other words, roles and states of the NAN terminal can be shifted in various ways and related examples are illustrated in FIG. 7. The roles and states, which the NAN terminal can have, may include a master (hereinafter, the master means a state of master role and sync), a Non-master sync, and a Non-master Non-sync. Transmission availability of the discovery beacon frame and/or the synchronization beacon frame can be determined according to each of the roles and states and it may be set as illustrated in Table 1.

TABLE 1

| Role and State | Discovery Beacon | Synchronization Beacon |
|---|---|---|
| Master | Transmission Possible | Transmission Possible |
| Non-Master Sync | Transmission Impossible | Transmission Possible |
| Non-Master Non-Sync | Transmission Impossible | Transmission Impossible |

The state of the NAN terminal can be determined according to a master rank (MR). The master rank indicates the preference of the NAN terminal to serve as the NAN master. In particular, a high master rank means strong preference for the NAN master. The NAN MR can be determined by Master Preference, Random Factor, Device MAC address, and the like according to Formula 1.

$$\text{MasterRank} = \text{MasterPreference} \ast 2^{56} + \text{RandomFactor} \ast 2^{48} + \text{MAC}[5] \ast 2^{40} + \ldots + \text{MAC}[0] \quad \text{[Formula 1]}$$

In Formula 1, the Master Preference, Random Factor, Device MAC address may be indicated through a master indication attribute. The master indication attributes may be set as illustrated in Table 2.

TABLE 2

| Field Name | Size (Octets) | Value | Description |
|---|---|---|---|
| Attribute ID | 1 | 0x00 | Identifies the type of NAN attribute. |
| Length | 2 | 2 | Length of the following field in the attribute |
| Master Preference | 1 | 0-255 | Information that is used to indicate a NAN Device's preference to serve as the role of Master, with a larger value indicating a higher preference. |
| Random Factor | 1 | 0-255 | A random number selected by the sending NAN Device. |

Regarding the above MR, in case of a NAN terminal that activates a NAN service and initiates a NAN cluster, each of the Master Preference and the Random Factor is set to 0 and NANWarmUp is reset. The NAN terminal should set a Master Preference field value in the master indication attribute to a value greater than 0 and a Random Factor value in the master indication attribute to a new value until when the NANWarmUp expires. When a NAN terminal joins a NAN cluster in which the Master Preference of an anchor master is set to a value greater than 0, the corresponding NAN terminal may set the Master Preference to a value greater than 0 and the Random Factor to a new value irrespective of expiration of the NANWarmUp.

Moreover, a NAN terminal can become an anchor master of a NAN cluster depending on an MR value. That is, all NAN terminals have capabilities of operating as the anchor master. The anchor master means the device that has a highest MR and a smallest AMBTT (anchor master beacon transmit time) value and has a hop count (HC) (to the anchor master) set to 0 in the NAN cluster. In the NAN cluster, two anchor masters may exist temporarily but a single anchor master is a principle of the NAN cluster. If a NAN terminal becomes an anchor master of a currently existing NAN cluster, the NAN terminal adopts TSF (Time Synchronization Function) used in the currently existing NAN cluster without any change.

The NAN terminal can become the anchor master in the following cases: if a new NAN cluster is initiated; if the master rank is changed (e.g., if an MR value of a different NAN terminal is changed or if an MR value of the anchor master is changed); or if a beacon frame of the current anchor master is not received any more. In addition, if the MR value of the different NAN terminal is changed or if the MR value of the anchor master is changed, the NAN terminal may lose the status of the anchor master. The anchor master can be determined according to an anchor master selection algorithm in the following description. In particular, the anchor master selection algorithm is the algorithm for determining which NAN terminal becomes the anchor master of the NAN cluster. And, when each NAN terminal joins the NAN cluster, the anchor master selection algorithm is driven.

If a NAN terminal initiates a new NAN cluster, the NAN terminal becomes the anchor master of the new NAN cluster. If a NAN synchronization beacon frame has a hop count in excess of a threshold, the NAN synchronization beacon frame is not used by NAN terminals. And, other NAN synchronization beacon frames except the above-mentioned NAN synchronization beacon frame are used to determine the anchor master of the new NAN cluster.

If receiving the NAN synchronization beacon frame having the hop count equal to or less than the threshold, the NAN terminal compares an anchor master rank value in the beacon frame with a stored anchor master rank value. If the stored anchor master rank value is greater than the anchor master value in the beacon frame, the NAN terminal discards the anchor master value in the beacon frame. If the stored anchor master value is less than the anchor master value in the beacon frame, the NAN terminal newly stores values greater by 1 than the anchor master rank and the hop count included in the beacon frame and an AMBTT value in the beacon frame. If the stored anchor master rank value is equal to the anchor master value in the beacon frame, the NAN terminal compares hop counters. Then, if a hop count value in the beacon frame is greater than a stored value, the NAN terminal discards the received beacon frame. If the hop count value in the beacon frame is equal to (the stored value−1) and if an AMBTT value is greater than the stored value, the NAN terminal newly stores the AMBTT value in the beacon frame. If the hop count value in the beacon frame is less than (the stored value−1), the NAN terminal increases the hop count value in the beacon frame by 1. The stored AMBTT value is updated according to the following rules. If the received beacon frame is transmitted by the anchor master, the AMBTT value is set to the lowest four octets of time stamp included in the received beacon frame. If the received beacon frame is transmitted from a NAN master or non-master sync device, the AMBTT value is set to a value included in a NAN cluster attribute in the received beacon frame.

Meanwhile, a TSF timer of a NAN terminal exceeds the stored AMBTT value by more than 16*512 TUs (e.g., 16 DW periods), the NAN terminal may assume itself as an anchor master and then update an anchor master record. In addition, if any of MR related components (e.g., Master Preference, Random Factor, MAC Address, etc.) is changed, a NAN terminal not corresponding to the anchor master compares the changed MR with a stored value. If the changed MR of the NAN terminal is greater than the stored value, the corresponding NAN terminal may assume itself as the anchor master and then update the anchor master record.

Moreover, a NAN terminal may set anchor master fields of the cluster attributes in the NAN synchronization and discovery beacon frames to values in the anchor master record, except that the anchor master sets the AMBTT value to a TSF value of corresponding beacon transmission. The NAN terminal, which transmits the NAN synchronization beacon frame or the discovery beacon frame, may be confirmed that the TSF in the beacon frame is derived from the same anchor master included in the cluster attribute.

Moreover, a NAN terminal may adopt a TSF timer value in a NAN beacon received with the same cluster ID in the following case: i) if the NAN beacon indicates an anchor master rank higher than a value in an anchor master record of the NAN terminal; or ii) if the NAN beacon indicates an anchor master rank equal to the value in the anchor master record of the NAN terminal and if a hop count value and an AMBTT value in the NAN beacon frame are larger values in the anchor master record.

NAN Synchronization

NAN terminals (devices) participating in the same NAN Cluster may be synchronized with respect to a common clock. A TSF in the NAN cluster can be implemented through a distributed algorithm that should be performed by all the NAN terminals. Each of the NAN terminals participating in the NAN cluster may transmit NAN synchronization beacon frame (NAN sync beacon frame) according to the above-described algorithm. The NAN device may synchronize its clock during a discovery window (DW). A length of the DW corresponds to 16 TUs. During the DW, one or more NAN terminals may transmit synchronization beacon frames in order to help all NAN terminals in the NAN cluster synchronize their own clocks.

Beacon transmission is distributed. A NAN beacon frame is transmitted during a DW period existing at every 512 TU. All NAN terminals can participate in generation and transmission of the NAN beacon according to their roles and states. Each of the NAN terminals should maintain its own TSF timer used for NAN beacon period timing. A NAN synchronization beacon interval can be established by the NAN terminal that generates the NAN cluster. A series of TBTTs are defined so that the DW periods in which synchronization beacon frames can be transmitted are assigned exactly 512 TUs apart. Time zero is defined as a first TBTT and the discovery window starts at each TBTT.

Figure 8:
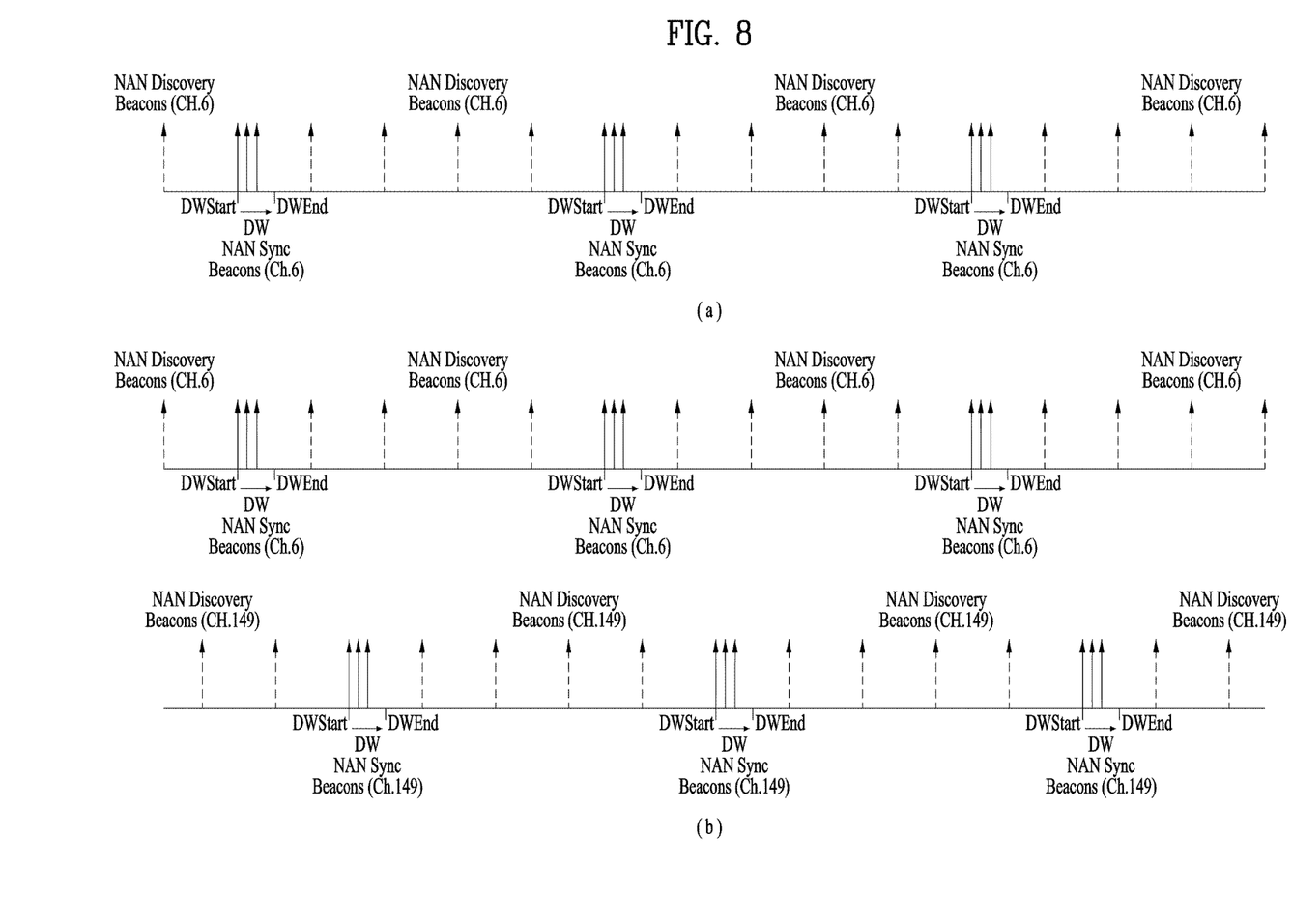

Each NAN terminal serving as a NAN master transmits a NAN discovery beacon frame from out of a NAN discovery window. On average, the NAN terminal serving as the NAN master transmits the NAN discovery beacon frame every 100 TUs. A time interval between consecutive NAN discovery beacon frames is smaller than 200 TUs. If a scheduled transmission time overlaps with a NAN discovery window of the NAN cluster in which the corresponding NAN terminal participates, the NAN terminal serving as the NAN master is able to omit transmission of the NAN discovery beacon frame. In order to minimize power required to transmit the NAN discovery beacon frame, the NAN terminal serving as the NAN master may use AC_VO (WMM Access Category—Voice) contention setting. FIG. 8 illustrates relations between a discovery window and a NAN discovery beacon frame and transmission of NAN synchronization/discovery beacon frames. Particularly, FIG. 8 (a) shows transmission of NAN discovery and synchronization beacon frames of a NAN terminal operating in 2.4 GHz band. FIG. 8 (b) shows transmission of NAN discovery and synchronization beacon frames of a NAN terminal operating in 2.4 GHz and 5 GHz bands.

Selection of NAN Cluster

If NAN functionality is activated, a NAN terminal can discover a NAN cluster through passive scanning or active scanning. Particularly, the NAN terminal may receive a NAN beacon frame (e.g., NAN discovery beacon frame) containing a cluster discovery attribute (i.e., passive scanning) in order to discover the NAN cluster. Alternatively, the NAN terminal may transmit a probe request frame and then receive a probe response frame containing a cluster discovery attribute in response to the probe request frame (i.e., active scanning) to discover the NAN cluster.

If one or more NAN clusters are discovered, the NAN terminal may join a NAN cluster with a highest cluster grade. Here, the NAN terminal may determine a NAN cluster grade according to Formula 2 below.

$$\text{ClusterGrade(CG)}=2^{64} \times A1 + A2 \qquad \text{[Formula 2]}$$

In Formula 2, A1 indicates Master Preference of an anchor master in a NAN cluster and A2 indicates an 8-octet TSF value of a NAN cluster.

To join the NAN cluster, the NAN terminal may wake up in a discovery window (DW) calculated based on a time offset field in the cluster discovery attribute contained in the NAN beacon frame (e.g., NAN discovery beacon frame) or probe response frame. Particularly, the NAN terminal may receive the NAN beacon frame (e.g., NAN synchronization beacon frame) containing a hop count to an anchor master through the DW. In this case, if the hop count to the anchor master is greater than a threshold, the NAN terminal may discard the received NAN beacon frame (e.g., NAN synchronization beacon frame). By doing so, only if the hop count to the anchor master is equal to or less than the threshold, the NAN terminal can join the NAN cluster. Here, the threshold is an implementation-specific value and thus it may have a unique value assigned by each NAN terminal manufacturer.

As described above, the NAN terminal may be configured to join the NAN cluster with the highest CG (cluster grade) value among several NAN clusters. However, in this case, if the hop count to the anchor master is greater than the threshold even though the NAN cluster has the highest CG, the NAN terminal may fail to join the corresponding NAN cluster. To solve this problem, the present invention proposes a method for a NAN terminal to join a new NAN cluster when a hop count to an anchor master of a NAN cluster, which the NAN terminal intends to join, is greater than a threshold.

First of all, if a NAN terminal discovers one NAN cluster, the NAN terminal may receive a NAN beacon frame from the discovered NAN cluster (i.e., a master NAN terminal of the NAN cluster). At this time, if a hop count to an anchor master contained in the NAN beacon frame is greater than a threshold, the NAN terminal may give up to join the NAN cluster and then create a new NAN cluster. In this case, the NAN terminal will operate as an anchor master of the newly created NAN cluster.

If the NAN terminal discovers two or more NAN clusters, the NAN terminal may receive the NAN beacon frame from a NAN cluster with a highest cluster grade. In this case, if the hop count to the anchor master contained in the NAN beacon frame is greater than the threshold, the NAN terminal may give up to join the corresponding NAN cluster and then receive the NAN beacon frame from a NAN cluster with a next highest cluster grade. That is, the NAN terminal may attempt to join all of the individual NAN clusters in descending order of CG. If the hop count to the anchor master in each of the NAN clusters is greater than the threshold, the NAN terminal may create a new NAN cluster. In this case, the NAN terminal will operate as an anchor master of the newly created NAN cluster. On the other hand, the NAN terminal may attempt to join all of the individual NAN clusters in ascending order of CG.

As another example, the NAN terminal may select a NAN cluster, from which the NAN terminal will receive the NAN beacon frame, with reference to services provided by NAN clusters. Particularly, the NAN terminal may discover a service provided by each NAN cluster through a discovery beacon frame transmitted from each NAN cluster. In this case, the discovery beacon frame transmitted by each NAN cluster may include a service related attribute. If the NAN terminal discovers NAN clusters that provide a service preferred (or desired) by the NAN terminal, the NAN terminal may receive the NAN beacon frame from any one of the NAN clusters that provide the service preferred by the NAN terminal. If the hop count to the anchor master contained in the received NAN beacon frame is greater than the threshold, the NAN terminal may receive the NAN beacon frame from another NAN cluster that provides the service preferred by the NAN terminal. In this case, if there are a plurality of the NAN clusters providing the service preferred by the NAN terminal, the NAN terminal may receive the NAN beacon frame, first of all, from the NAN cluster with the highest cluster grade among the plurality of the NAN clusters.

Reception of a Plurality of NAN Beacon Frames

According to the above-mentioned example, when discovering the plurality of the NAN clusters, the NAN terminal may receive the NAN beacon frame, first of all, from the NAN cluster with the highest CG or the NAN cluster that provides the service preferred by the NAN terminal among the plurality of the NAN clusters.

As another example, when a NAN terminal discovers a plurality of NAN clusters, the NAN terminal may receive NAN beacon frames from two or more NAN clusters. In this case, the NAN terminal may join the two or more NAN clusters at the same time.

Particularly, the NAN terminal may select a predetermined number of NAN clusters from the plurality of the NAN clusters in descending order of CG and then receive the NAN beacon frames from the selected NAN clusters.

As another example, the NAN terminal may select a predetermined number of NAN clusters from the plurality of the NAN clusters that provide a service preferred by the NAN terminal and then receive the NAN beacon frames from the selected NAN clusters. In this case, the NAN terminal may select the predetermined number of the NAN clusters from the plurality of the NAN clusters that provide the service preferred by the NAN terminal in descending order of CG.

The NAN terminal may receive the NAN beacon frames from all the discovered NAN clusters or from all the NAN clusters that provide the service preferred by the NAN terminal among all the discovered NAN clusters.

As further example, the NAN terminal may receive the NAN beacon frames in order of discovering NAN clusters. Alternatively, the NAN terminal may receive the NAN beacon frames in random order.

Configuration of Threshold

If a hop count to an anchor master is equal to or greater than a threshold, a NAN terminal may neglect a beacon frame (e.g., synchronization beacon frame) (i.e., discards the beacon frame). In this case, the threshold is an implementation-specific and thus it may have a unique value assigned by each NAN terminal manufacturer. As a result, individual NAN terminals may have different thresholds in a single cluster.

However, if the NAN terminals have different thresholds in the single cluster, it may cause a problem to an anchor master selection procedure. For instance, if a plurality of anchor masters temporarily exist in the single cluster due to the anchor master selection, the NAN terminal may discard a synchronization beacon frame broadcasted by an anchor master with a hop count greater than the threshold among the plurality of the anchor masters. Thus, much time is required to merge the plurality of the anchor masters into a single anchor master and it is also difficult to match time synchronization in the cluster. In addition, it may cause a problem of increasing complexity in the cluster. To solve these problems, the present invention proposes a method for all NAN terminal in a cluster to have a common threshold.

First of all, the threshold can be determined by a NAN terminal that first creates the cluster. In this case, the NAN terminal may add an HC threshold field, which represents the threshold, to an anchor master information field of a cluster attribute included in a NAN attribute of an NAN information element. For instance, a NAN attribute format can be defined as shown in Table 3.

TABLE 3

| Field | Size(Octets) | Value(Hex) | Description |
|---|---|---|---|
| Attribute ID | 1 | Variable | Identifies the type of NAN attribute defined in Table 4 |
| Length | 2 | Variable | Length of the following field in the attribute |
| Attribute body field | Variable | Variable | NAN attribute specific information fields |

NAN attribute identifiers, which may be included in the NAN attribute, can be defined as shown in Table 4.

TABLE 4

| Attribute ID | Mandatory (M)/ Optional (O) | Description |
|---|---|---|
| 0 | M | Master indication attribute |
| 1 | M | Cluster attribute |
| 2 | O | Service ID attribute |
| 3 | O | NAN connection capability attribute |
| 4 | O | WLAN infrastructure attribute |
| 5 | O | P2P operation attribute |

TABLE 4-continued

| Attribute ID | Mandatory (M)/ Optional (O) | Description |
| --- | --- | --- |
| 6 | O | IBSS attribute |
| 7 | O | Mesh attribute |

As shown in the example of Table 4, the cluster attribute should be mandatorily included in the NAN attribute. In addition, the cluster attribute may contain information related to a NAN cluster. For instance, a cluster attribute format can be defined as shown in Table 5.

TABLE 5

| Field | Size (Octets) | Value | Description |
| --- | --- | --- | --- |
| Attribute ID | 1 | 0x01 | Identifies the type of NAN attribute |
| Length | 2 | 13 | Length of the following field in the attribute |
| Anchor master information | 13 + x | Variable | Information on the anchor master of the cluster |

As shown in the example of Table 5, the anchor master information field can be included in the cluster attribute. For example, a format of the anchor master information field contained in the cluster attribute can be defined as shown in Table 6.

TABLE 6

| Field | Size (Octets) | Value | Description |
| --- | --- | --- | --- |
| Anchor master rank | 8 | Variable | Master rank |
| Hop count to anchor master | 1 | Variable | Hop count to an anchor master |
| Anchor master beacon transmission time (AMBTT) | 4 | Variable | When it is transmitted by a non-anchor master terminal, the lowest four octets of TSF of a transmission time of a beacon transmitted by an anchor master are selected. When transmitted by the anchor master, it is set to 0x00000000. |
| HC threshold to anchor master | x | Predetermined | HC threshold of the NAN cluster |

As shown in the example of the Table 6, an HC threshold to an anchor master can be included in the anchor master information field. Thus, if a NAN terminal receives a NAN beacon frame (e.g., a discovery beacon frame or a synchronization beacon frame) containing the NAN attribute, the NAN terminal may compare the threshold indicated by the HC threshold to anchor master field with the HC to the anchor master and then determine whether to discard the NAN beacon frame. That is, according to the present invention, since the threshold indicated by the HC threshold to anchor master field is adopted, all the NAN terminals in the NAN cluster can have the common threshold.

In the above example, it is described that the HC threshold to anchor master field is included in the cluster attribute. However, unlike the example, the HC threshold to anchor master field may be included in the master indication attribute contained in the NAN attribute. Since the cluster attribute and the master indication attribute should be mandatorily included in the NAN attribute as shown in the example of Table 4, all the NAN terminals, which receive the NAN beacon frames, in the NAN cluster can have the common threshold.

Figure 9:
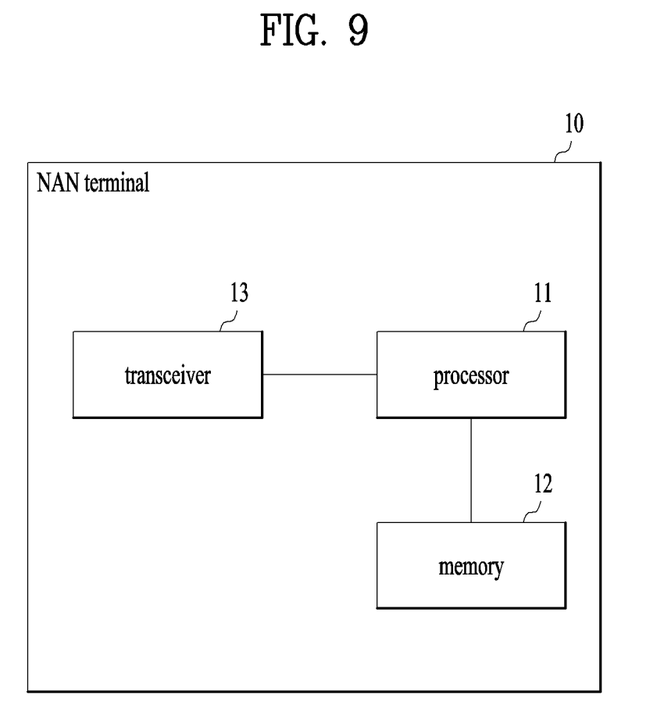
FIG. 9 is a block diagram illustrating a configuration of a wireless device according to one embodiment of the present invention.

FIG. 9 is a block diagram illustrating a configuration of a wireless device according to one embodiment of the present invention.

Referring to FIG. 9, a wireless device 10 may include a processor 11, a memory 12, and a transceiver 13. The transceiver 13 can transmit/receive radio signals and implement a physical layer according to, for example, IEEE 802 system. The processor 11 is connected to the transceiver 13 electrically and can then implement the physical layer and/or a MAC layer according to the IEEE 802 system. Moreover, the processor 11 may be configured to perform at least one operation of the application, the service and the ASP layer according to the various embodiments of the present invention mentioned in the foregoing description. Alternatively, the processor 11 may be configured to perform operations related to a device operating as an AP/STA. Moreover, a module for implementing the operations of the wireless device according to the various embodiments of the present invention mentioned in the foregoing description may be saved in the memory 12 and then driven by the processor 11. The memory 12 may be included inside the processor 11 or be provided outside the processor 11. And, the memory 12 can be connected to the processor 11 through known means.

The detailed configuration of the wireless device 10 in FIG. 9 may be implemented such that each of the various embodiments of the present invention described above is applied independently or at least two thereof are simultaneously applied. And, redundant description shall be omitted for clarity.

The embodiments of the present invention mentioned in the foregoing description can be implemented using various means. For instance, the embodiments of the present invention can be implemented using hardware, firmware, software and/or any combinations thereof.

In case of the implementation by hardware, a method according to the embodiments of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to the embodiments of the present invention can be implemented by modules, procedures, and/or functions for performing the above-explained functions or operations. Software code is stored in the memory unit and can be driven by the processor. The memory unit is provided within or outside the processor to exchange data with the processor through the various means known to the public As mentioned in the foregoing description, the detailed descriptions for the preferred embodiments of the present invention are provided to enable those skilled in the art to implement and practice the invention. While the present invention has been described herein with reference to the preferred embodiments thereof, it will be apparent to those skilled in the art that various modifications and variations can be made therein without departing from the spirit and scope of the invention. Therefore, the present invention is not limited to the embodiments disclosed herein but intends to give a broadest scope that matches the principles and new features disclosed herein.

INDUSTRIAL APPLICABILITY

Although the various embodiments of the present invention have been described above mainly with reference to an IEEE 802.11 system, the present invention can be applied to various mobile communication systems in the same manner.

What is claimed is:

1. A method of joining a neighbor awareness networking (NAN) cluster by a NAN terminal in a wireless communication system, the method comprising:
discovering a plurality of NAN clusters;
receiving a first NAN beacon frame from a first NAN cluster among the plurality of NAN clusters,
wherein the first NAN beacon frame comprises a threshold field indicating a value which is commonly used for all NAN terminals in the first NAN cluster;
updating a threshold to the value indicated by the threshold field; and
receiving a second NAN beacon frame from a second NAN cluster among the plurality of NAN clusters in response to a hop count to an anchor master indicated by the received first NAN beacon frame being greater than the threshold.

2. The method of claim 1, wherein the first NAN beacon frame and the second NAN beacon frame are received in order of cluster grade of the plurality of NAN clusters.

3. The method of claim 2, wherein the cluster grade satisfies a formula of: $2^{64}*A1+A2$ where the A1 represents Master Preference of the anchor master and the A2 represents a Time Synchronization Function (TSF) value of each of the plurality of NAN clusters.

4. The method of claim 1, wherein each of the first NAN cluster and the second NAN cluster is a NAN cluster providing a service preferred by the NAN terminal among the plurality of NAN clusters.

5. The method of claim 1,
wherein the discovering the plurality of NAN clusters comprises:
transmitting probe request frames; and
receiving probe request frames in response to the probe request frame, and
wherein the receiving the first NAN beacon frame comprises receiving the first NAN beacon frame by waking up in a discovery window calculated based on a time offset field value contained in one of the probe response frames.

6. The method of claim 1,
wherein the discovering the plurality of NAN clusters comprises:
receiving NAN discovery beacon frames, and
wherein the receiving the first NAN beacon frame comprises receiving the first NAN beacon frame by waking up in a discovery window calculated based on a time offset field value contained in one of the NAN discovery beacon frames.

7. The method of claim 1, wherein the first NAN beacon frame and the second NAN beacon frame are received in order of which the plurality of NAN clusters are discovered.

8. The method of claim 1, further comprising:
creating new NAN cluster in response to each hop count of all anchor masters in the plurality of NAN clusters being greater than the threshold.

9. The method of claim 1, wherein the updating the threshold comprises updating the threshold only in response to the hop count to the anchor master indicated by the first NAN beacon frame being less than the threshold.

10. A neighbor awareness networking (NAN) terminal apparatus for joining a NAN cluster in a wireless communication system, the NAN terminal apparatus comprising:
a transceiving module; and
a processor,
wherein the processor is configured to:
control the transceiving module to discover a plurality of NAN clusters,
control the transceiving module to receive a first NAN beacon frame from a first NAN cluster among the plurality of NAN clusters,
wherein the first NAN beacon frame comprises a threshold field indicating a value which is commonly used for all NAN terminals in the first NAN cluster,
update a threshold to the value indicated by the threshold field, and
control the transceiving module to receive a second NAN beacon frame from a second NAN cluster among the plurality of NAN clusters in response to a hop count to an anchor master indicated by the received NAN beacon frame being greater than the threshold updated to the value indicated by the threshold field.

* * * * *